United States Patent
Paillet

(10) Patent No.: US 9,185,847 B2
(45) Date of Patent: Nov. 17, 2015

(54) BINDING APPARATUS

(71) Applicant: DEERE & COMPANY, Moline, IL (US)

(72) Inventor: Frederic Paillet, Gray (FR)

(73) Assignee: DEERE & COMPANY, Moline, IL (US)

( * ) Notice: Subject to any disclaimer, the term of this patent is extended or adjusted under 35 U.S.C. 154(b) by 97 days.

(21) Appl. No.: 13/886,398

(22) Filed: May 3, 2013

(65) Prior Publication Data

US 2014/0326147 A1 Nov. 6, 2014

(51) Int. Cl.
*A01F 15/14* (2006.01)

(52) U.S. Cl.
CPC ......... *A01F 15/141* (2013.01); *A01F 2015/143* (2013.01)

(58) Field of Classification Search
CPC .......................... A01F 15/141; A01F 2015/143
USPC ............ 100/5, 8, 13, 87, 88, 89; 56/341, 342, 56/343; 83/346, 909
See application file for complete search history.

(56) References Cited

U.S. PATENT DOCUMENTS

| | | | |
|---|---|---|---|
| 4,024,804 A * | 5/1977 | Hanson | 100/5 |
| 4,457,226 A * | 7/1984 | Meiers | 100/5 |
| 5,215,006 A * | 6/1993 | Jennings et al. | 100/5 |
| 5,437,226 A * | 8/1995 | Wagstaff | 100/5 |
| 5,465,658 A * | 11/1995 | Wagstaff et al. | 100/5 |
| 5,855,167 A | 1/1999 | Goossen et al. | |

FOREIGN PATENT DOCUMENTS

| | | |
|---|---|---|
| EP | 0680689 A2 | 11/1995 |
| EP | 0819376 A1 | 1/1998 |
| WO | 9718700 A1 | 5/1997 |

OTHER PUBLICATIONS

European Search Report, dated Jul. 3, 2013 (9 pages).

* cited by examiner

*Primary Examiner* — Jimmy T Nguyen

(57) ABSTRACT

A binding apparatus for a round baler binding a pressed bale with a binding twine. The binding apparatus has at least one binding twine guide, at least one binding twine guided by the binding twine guide and at least one cutting device for severing the binding twine after a binding operation. The cutting device has a cutting element guide and, formed on the cutting element guide, a cutting element holder to which is fastened a cutting element which has a cutting edge, in order to sever the binding twine, is guided to the binding twine by the cutting element guide and is brought into contact with the binding twine. In order to reduce wear on the cutting element and to increase the cut quality at the binding twine, a deflecting edge is formed on the cutting element guide between the cutting element and the binding twine, said deflecting edge displacing the binding twine in a deflecting movement, with binding twine tension being built up, before the binding twine is brought into contact with the cutting edge.

2 Claims, 4 Drawing Sheets

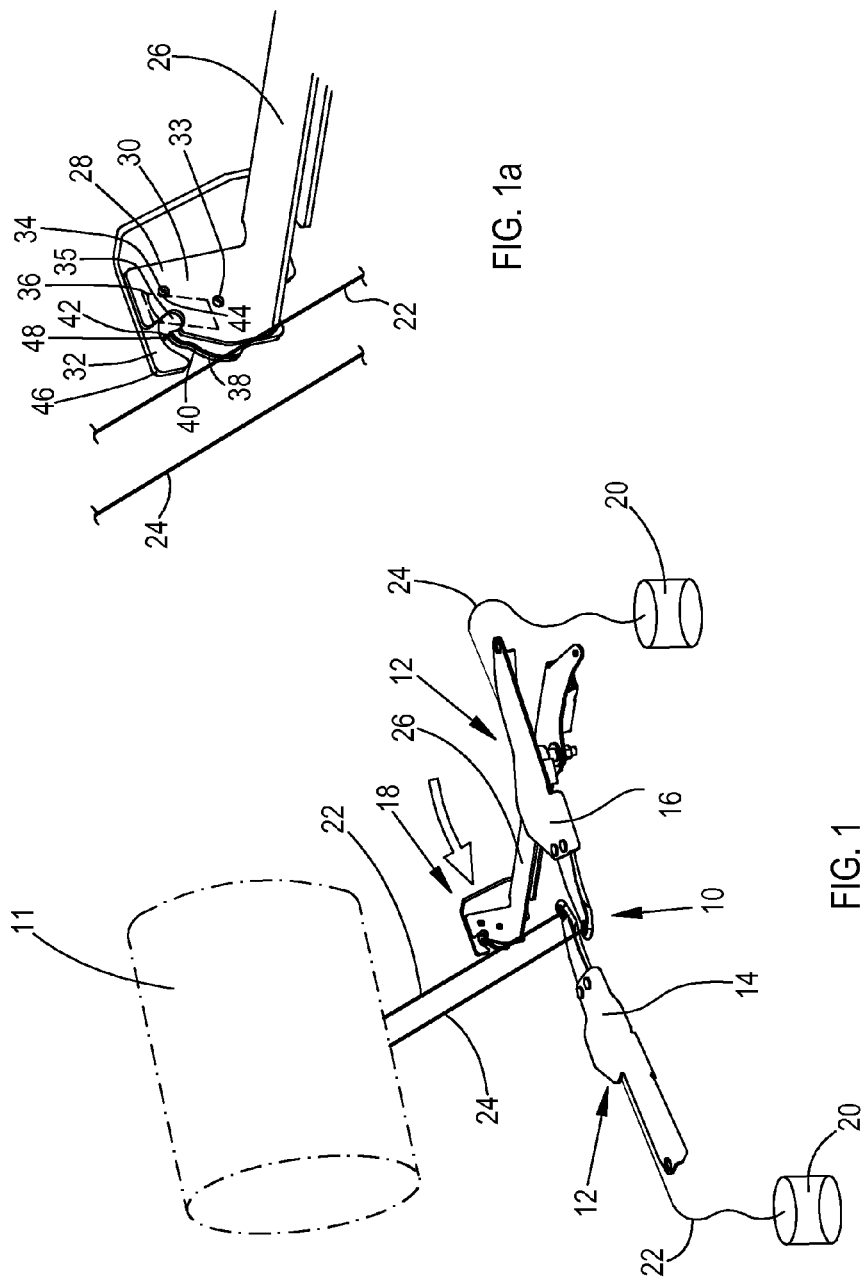

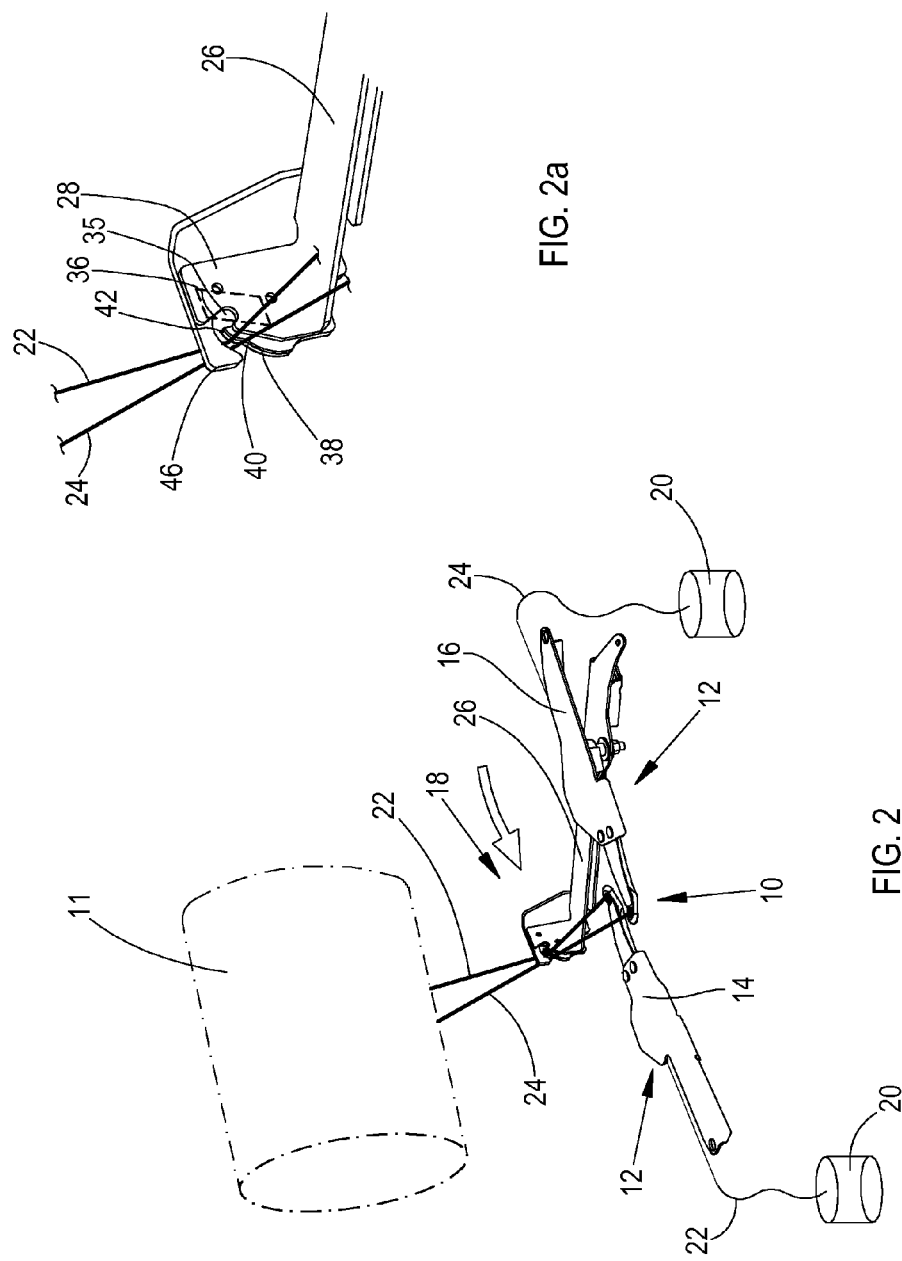

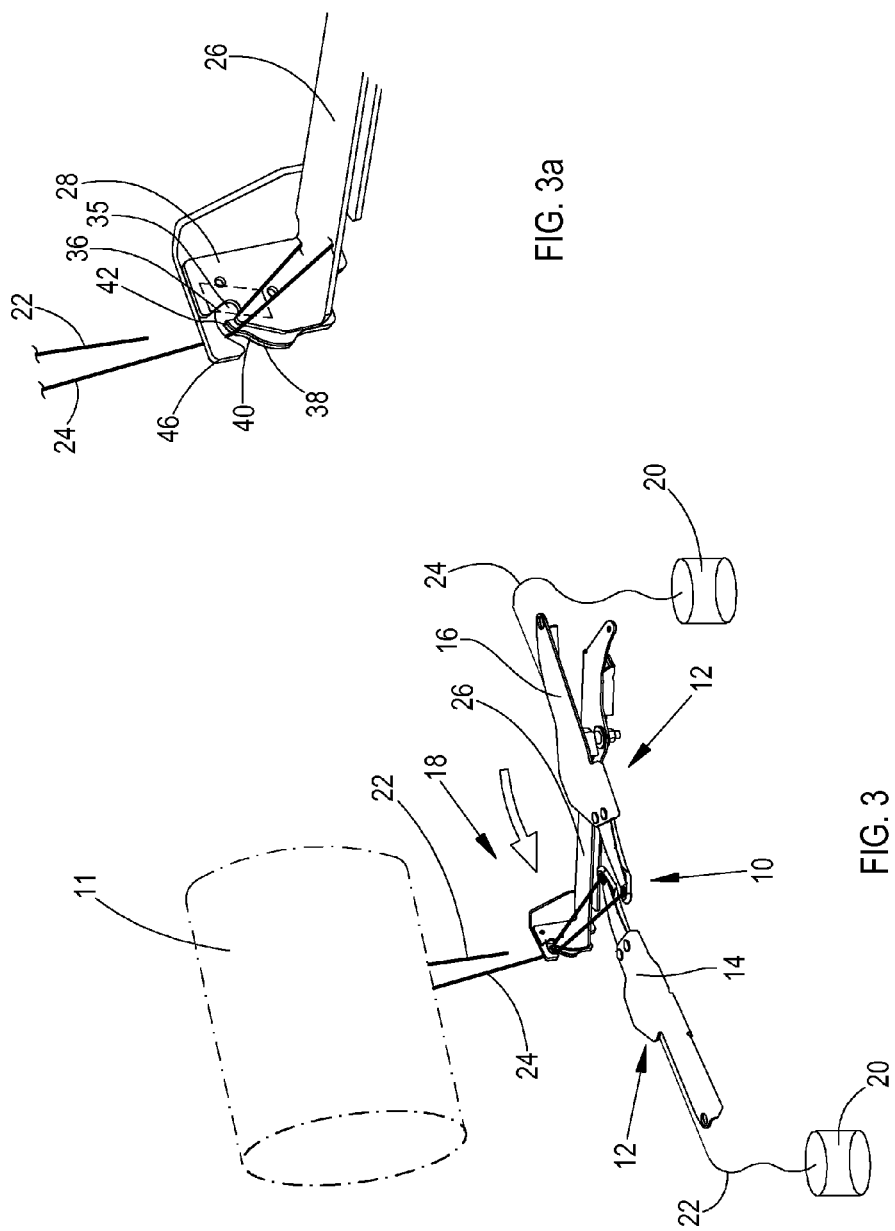

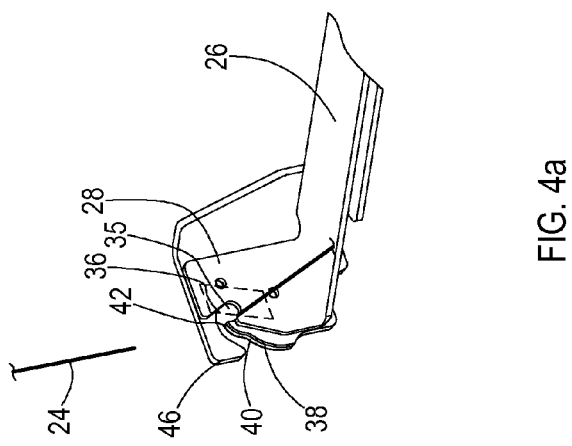
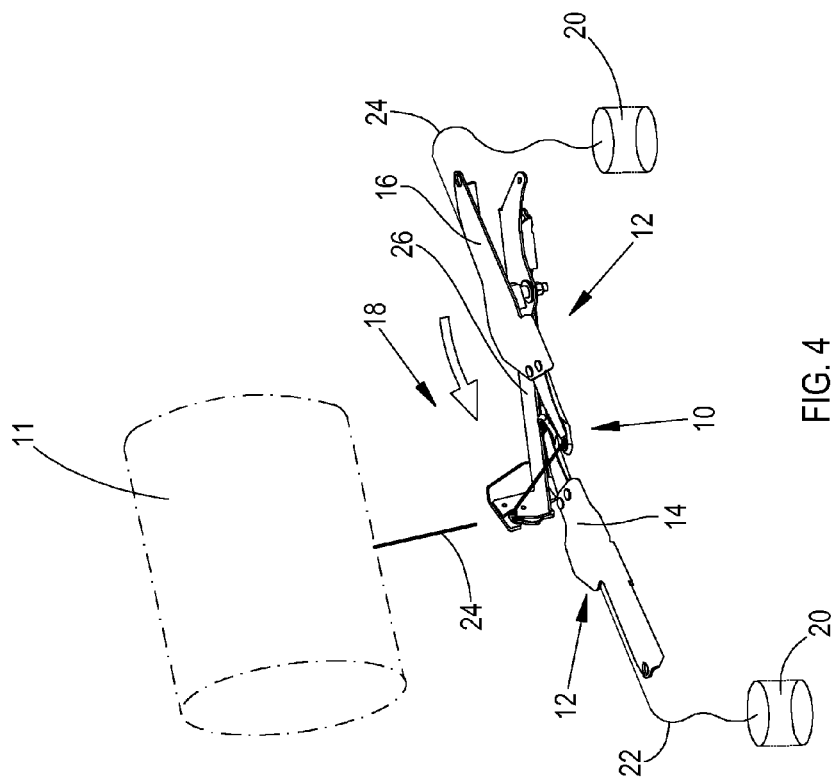

BINDING APPARATUS

FIELD OF THE DISCLOSURE

The disclosure relates to a binding apparatus for a round baler in order to bind a pressed bale with a binding twine, having at least one binding twine guide, at least one binding twine guided by the binding twine guide and at least one cutting device for severing the binding twine after a binding operation. The cutting device comprises a cutting element guide and, formed on the cutting element guide, a cutting element holder to which there is fastened a cutting element which has a cutting edge and which, in order to sever the binding twine, is guided to the binding twine by the cutting element guide and is brought into contact with the binding twine.

BACKGROUND OF THE DISCLOSURE

Balers which are equipped with a binding apparatus in order to hold the crop pressed to form a bale together by wrapping a twine around it are known. Such binding apparatuses generally comprise a mechanically controlled binding twine guide in the form of one or more guide arms which guide the binding twine along the bale winding surface while the round bale is rotated. After completion of the binding operation, the binding twine has to be severed in order that the bale can leave the baling chamber. In order to sever the binding twine, use is made of cutting devices which are coupled to the guide arms and are guided in the direction of the binding twine after or during the binding operation. The cutting device generally comprises a cutting knife guide, for example in the form of a further guide arm, having a cutting knife holder in which a cutting knife is held. The guide arms are controlled such that, after completion of the binding operation, the cutting edge of the cutting knife comes into contact with the binding twine. Generally, the binding twine meets the cutting blade edge to edge and under low binding twine tension, thereby resulting in an inadequate cut surface of the binding twine and also in wear of the cutting knife and thus in a short service life. Furthermore, a poor cut surface on the binding twine can lead to fraying of the binding twine. As a result, the subsequent threading process for the new bale can be hindered, leading to interruptions in the bale-winding process and thus to increased expenditure of time.

SUMMARY OF THE DISCLOSURE

The object underlying the disclosure is considered that of specifying a binding apparatus of the type mentioned at the beginning, by way of which the abovementioned problems are overcome.

According to the disclosure, a binding apparatus of the type mentioned at the beginning is formed such that a deflecting edge is formed on the cutting element guide between the cutting element and the binding twine, said deflecting edge displacing the binding twine in a deflecting movement, with binding twine tension being built up, before the binding twine is brought into contact with the cutting edge. By way of the deflecting edge, the binding twine is brought into a kind of pretension and is also deflected, such that the severing of the binding twine is executed during the engagement of the cutting edge by way of a relative movement of the binding twine in the longitudinal direction of the cutting edge and with increased binding twine tension. As a result, the wear of the cutting edge is reduced and the cut surface on the binding twine is optimized.

The deflecting edge may be formed such that the binding twine is moved along the deflecting edge towards the cutting edge, with binding twine tension being increasingly built up. On account of the continuous movement of the cutting knife guide, the binding twine slides over the surface of the deflecting edge. To this end, the deflecting edge can be beveled and form a kind of oblique plane or ramp, over which the binding twine is guided. The binding twine tension increases while the binding twine moves continuously towards the cutting edge.

The deflecting edge may comprise an indentation or hollow, by way of which the movement of the binding twine along the deflecting edge towards the cutting edge can be slowed down, with the binding twine tension being increasingly built up. As a result, there is generated a kind of tension peak, as a result of which the binding twine is released in a catapult-like manner from the recess after the binding twine tension has increased in a corresponding manner. As a result of the catapult-like release, the binding twine moves in an accelerated manner in the direction of the cutting edge. This additionally increases the cutting effect.

The deflecting edge may comprise an end region at which the binding twine is released under built-up binding twine tension and maximum deflection by the deflecting edge. The binding twine is then guided over a kind of high point in the course of its travel along the deflecting edge towards the cutting surface, and so it can slip over the end region under the greatest binding twine tension and is consequently moved at high speed in a sliding movement along the cutting edge and is severed cleanly.

A bar is formed on the cutting element holder, said bar extending over the cutting edge and over the end region of the deflecting edge. The bar prevents direct access to the cutting edge, which is covered both by the bar and by the deflecting edge. In addition, the bar also protects the cutting edge itself against damage.

A binding apparatus according to the disclosure is used in balers, preferably round balers.

BRIEF DESCRIPTION OF THE DRAWINGS

The embodiment(s) of the disclosure are described in detail below with reference to the accompanying drawings, wherein:

FIG. 1 is a schematic view of a binding apparatus according to the disclosure having a cutting device, during the binding operation;

FIG. 1a is an enlarged view of the cutting device of the binding apparatus from FIG. 1;

FIG. 2 is a schematic view of the binding apparatus according to the disclosure having a cutting device, at the beginning of a first cutting operation (after the binding operation);

FIG. 2a is an enlarged view of the cutting device of the binding apparatus from FIG. 2;

FIG. 3 is a schematic view of the binding apparatus according to the disclosure having a cutting device, at the beginning of a second cutting operation (after the binding operation);

FIG. 3a is an enlarged view of the cutting device of the binding apparatus from FIG. 3;

FIG. 4 is a schematic view of a binding apparatus according to the disclosure having a cutting device, after the cutting operations; and FIG. 4a is an enlarged view of the cutting device of the binding apparatus from FIG. 1.

DESCRIPTION OF THE PREFERRED EMBODIMENT

FIGS. 1, 1a to 4, 4a illustrate the binding operation and the cutting operation for a binding apparatus 10 according to the disclosure. The binding apparatus 10 can be used in conventional round balers (not shown), as are known in particular in agriculture for baling crops to form a round bale 11. The binding apparatus 10 comprises a binding twine guide 12, comprising a first and a second binding twine guide arm 14, 16, a cutting device 18 and supply reels 20 for binding twine 22, 24, wherein a first binding twine 22 is guided by the first binding twine guide arm 14 and a second binding twine 24 is guided by the second binding twine guide arm 16. The cutting device 18 comprises a cutting element guide 26 and a cutting element holder 28 formed on the cutting element guide 26 (see in particular FIGS. 1a, 2a, 3a and 4a). The cutting element guide 26 is formed in the form of a further guide arm, wherein the binding twine guide arms 14, 16 are mechanically coupled to the cutting element guide 26 and execute in a known manner synchronously matched movements which are described in more detail in the following text on the basis of FIGS. 1a, 2a, 3a and 4a. The mechanical coupling is selected as such only by way of example, and so synchronously matched movements of the guide arms 14, 16, 26 can also be realized by electronic or hydraulic and pneumatic actuators. The cutting element holder 28 on the cutting element guide 26 comprises a fastening plate 30 to which a clamping plate 32 is fastened by fastening elements in the form of screw connections 33, 34. Clamped between the fastening plate 30 and the clamping plate 32 is a cutting element 35 in the form of a cutting knife having a sharp cutting edge 36. On the cutting element holder 28, a deflecting edge 38 is formed on the clamping plate 32. Formed at the deflecting edge 38 is an indentation 40 or hollow, which opens into an end region 42 of the deflecting edge 38, wherein the deflecting edge extends obliquely in the direction of the cutting element 35 so that a binding twine 22, 24 sliding or guided along the deflecting edge 38 moves in the direction of the cutting edge 36. Provided on the cutting element 35 for securing the position of the cutting element 35 is a cutout 44, which is engaged with the screw connection 34 such that the cutting element 34 has a preset fit and thus the cutting edge 36 has a preset orientation. Furthermore, a bar 46 in the form of a finger is formed on the cutting element holder 28 on the clamping plate 32, said bar 46 extending over the cutting edge 36, over the deflecting edge 38 and over the end region 42 and forming with the deflecting edge 38 a binding twine guide channel 48 through which the binding twine 22, 24 is guided during a cutting operation. In addition, the cutting edge 36 is covered by the bar 46 and thus protected against damage or being accessed by an operator, for example during maintenance work.

The binding operation for wrapping the round bale 11 takes place in that the binding twine 22, 24 is guided by the appropriate binding twine guide arms 14, 16 from the end sides of the round bale 11, along the circumferential surface of the round bale, to the middle (see FIG. 1), while said round bale is undergoing a rotary movement brought about by the round baler. The round bale 11 is thus wrapped with a plurality of windings of binding twine 22, 24, so that the pressed shape of the round bale 11 is retained by the binding twine 22, 24. At the same time, the cutting element guide 26 is guided from the outside to the middle of the round bale 11 and then a cutting operation for severing the binding twine 22, 24 is initiated (see in particular FIGS. 1a to 4a).

FIG. 1a shows the state in which the cutting element holder 28 comes into contact with the first binding twine 22 by way of the deflecting edge 38. The binding twine 22 slides along the obliquely formed surface of the deflecting edge 38 in the direction of the cutting element 35 and, by way of the continued movement (see arrows in FIGS. 1, 2, 3 and 4) of the cutting element guide 26 and also by way of the associated friction force, executes a deflecting movement upwards (along the deflecting edge 38) and to the side, as a result of which a binding twine tension is built up and the binding twine 22 is tensioned against the deflecting edge 38 (see FIG. 2a). The binding twine 22 slides along the deflecting edge 38 into the indentation 40 or hollow, as a result of which the sliding movement of the binding twine 22, on continued movement of the cutting element guide 26, is slowed down or interrupted and as a result the binding twine tension is further increased. At the same time, the deflecting edge 38 comes into contact with the second binding twine 24, which begins likewise to execute the described sliding movement along the deflecting edge 38 (see FIG. 2a). The first binding twine 22 then reaches a maximum binding twine tension and slides over the end region 42 of the deflecting edge 38 and is guided under pretension by the built-up binding twine tension both against the cutting edge 36 and also in the longitudinal direction along the cutting edge 36 so that a sliding cutting movement along the cutting edge 36 is executed and not just a thrusting movement against the cutting edge 36 (see FIG. 3a). As a result, the binding twine 22 is severed with a clean cut surface. On continued movement of the cutting element guide 26 (see arrow in FIG. 2), the second binding twine 24 experiences the same movement sequence as has already been described for the first binding twine 22, until said second binding twine 24 is also severed cleanly in a sliding cutting movement along the cutting edge 36 (see FIG. 4a). On account of the sliding cutting movements on the binding twines 22, 24, the cutting edge 36 of the cutting element 35 is looked after and wear is reduced. At the same time, the cut quality on the cut surfaces of the binding twine 22, 24 is improved and fraying of the binding twine 22, 24 is avoided.

Having described the preferred embodiment, it will become apparent that various modifications can be made without departing from the scope of the disclosure as defined in the accompanying claims.

The invention claimed is:

1. A binding apparatus for a round baler in order to bind a pressed bale with a binding twine, comprising at least one binding twine guide, at least one binding twine guided by the binding twine guide and at least one cutting device for severing the binding twine after a binding operation, wherein the cutting device comprises a cutting element guide and, formed on the cutting element guide, a cutting element holder to which there is fastened a cutting element which has a cutting edge and which, in order to sever the binding twine, is guided to the binding twine by the cutting element guide and is brought into contact with the binding twine, wherein a deflecting edge is formed on the cutting element guide between the cutting element and the binding twine, said deflecting edge displacing the binding twine in a deflecting movement, with binding twine tension being built up, before the binding twine is brought into contact with the cutting edge, wherein the deflecting edge comprises an indentation, by way of which the movement of the binding twine along the deflecting edge towards the cutting edge is slowed down, with the binding twine tension being increasingly built up.

2. A binding apparatus for a round baler in order to bind a pressed bale with a binding twine, comprising at least one binding twine guide, at least one binding twine guided by the binding twine guide and at least one cutting device for severing the binding twine after a binding operation, wherein the cutting device comprises a cutting element guide and, formed on the cutting element guide, a cutting element holder to which there is fastened a cutting element which has a cutting edge and which, in order to sever the binding twine, is guided to the binding twine by the cutting element guide and is brought into contact with the binding twine, wherein a deflecting edge is formed on the cutting element guide between the cutting element and the binding twine, said deflecting edge displacing the binding twine in a deflecting movement, with binding twine tension being built up, before the binding twine is brought into contact with the cutting edge, wherein a bar is formed on the cutting element holder, said bar extending over the cutting edge and over the end region of the deflecting edge.

* * * * *